United States Patent
Jiang et al.

(10) Patent No.: US 11,546,755 B2
(45) Date of Patent: Jan. 3, 2023

(54) CENTRALIZED CONFIGURATOR SERVER FOR DPP PROVISIONING OF ENROLLEES IN A NETWORK

(71) Applicant: Hewlett Packard Enterprise Development LP, Houston, TX (US)

(72) Inventors: Yafeng Jiang, Beijing (CN); Chunfeng Wang, Beijing (CN); Jiabao Jin, Beijing (CN); Guangning Qin, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 817 days.

(21) Appl. No.: 16/240,148

(22) Filed: Jan. 4, 2019

(65) Prior Publication Data

US 2020/0221296 A1 Jul. 9, 2020

(51) Int. Cl.
*H04W 12/041* (2021.01)
*H04W 12/06* (2021.01)
*H04L 41/0806* (2022.01)
*H04L 9/40* (2022.01)
*H04L 9/08* (2006.01)
*H04L 41/28* (2022.01)
*H04W 12/50* (2021.01)
*H04W 84/12* (2009.01)

(52) U.S. Cl.
CPC ......... *H04W 12/041* (2021.01); *H04L 9/0827* (2013.01); *H04L 41/0806* (2013.01); *H04L 41/28* (2013.01); *H04L 63/0435* (2013.01); *H04L 63/061* (2013.01); *H04W 12/06* (2013.01); *H04W 12/50* (2021.01); *H04W 84/12* (2013.01)

(58) Field of Classification Search
CPC .......... H04L 2209/805; H04L 41/0806; H04L 41/28; H04L 63/0435; H04L 63/06; H04L 63/061; H04L 63/0869; H04L 9/0822; H04L 9/0827; H04L 9/3215; H04W 12/041; H04W 12/06; H04W 12/35; H04W 12/50; H04W 84/12
See application file for complete search history.

(56) References Cited

U.S. PATENT DOCUMENTS

| | | |
|---|---|---|
| 2015/0229475 A1 | 8/2015 | Benoit et al. |
| 2017/0041859 A1 | 2/2017 | Martin et al. |
| 2017/0257819 A1 | 9/2017 | McCann et al. |
| 2017/0295448 A1 | 10/2017 | McCann et al. |

(Continued)

OTHER PUBLICATIONS

Secure Iot Bootstrapping: a Survey Draft-sarikaya-t2trg-sbootstrapping, (Research Paper), Jul. 16, 2017, 20 Pgs.

*Primary Examiner* — Theodore C Parsons
(74) *Attorney, Agent, or Firm* — Sheppard Mullin Richter & Hampton LLP

(57) ABSTRACT

Systems and methods are provided for implementing a centralized configurator server/service in the cloud that can take the place of conventional mobile devices used for provisioning IoT devices or WiFi clients in a network. In order to provision the IoT devices or WiFi clients, a mobile device or access point (AP) may be used to relay Device Provisioning Protocol (DPP) messages and/or information between the centralized configurator server/service and the IoT devices or WiFi clients.

20 Claims, 7 Drawing Sheets

(56) References Cited

U.S. PATENT DOCUMENTS

| | | |
|---|---|---|
| 2018/0109381 A1 | 4/2018 | Cammarota et al. |
| 2018/0109418 A1 | 4/2018 | Cammarota et al. |
| 2019/0306705 A1* | 10/2019 | Suzuki .............. H04W 12/0431 |
| 2019/0332774 A1* | 10/2019 | Nix ..................... H04L 63/0876 |
| 2019/0341954 A1* | 11/2019 | Zalewski ................ H04W 4/80 |
| 2019/0356482 A1* | 11/2019 | Nix ....................... H04L 9/0841 |

* cited by examiner

CENTRALIZED CONFIGURATOR SERVER FOR DPP PROVISIONING OF ENROLLEES IN A NETWORK

DESCRIPTION OF RELATED ART

The Internet of Things (IoT) can refer to a system or network of devices or items that are provided with unique identifiers that allow them to transfer data over a network. These objects may be embedded with sensors that enable these objects to collect and exchange data. For example, one IoT model connects headless sensors over wireless connections to a cloud service that manages the headless sensors and collects traffic. The wireless connections may be established, for example, over a wireless local area network (WLAN) such as a WiFi network.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
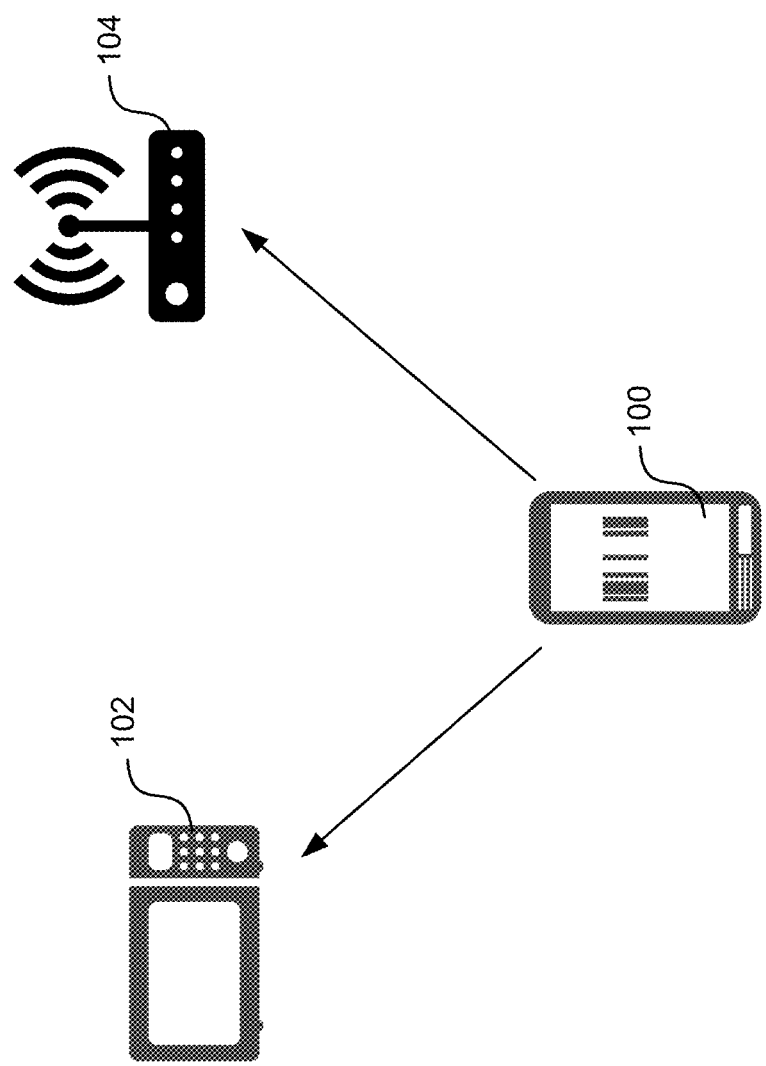
FIG. 1 is an example of Device Provisioning Protocol (DPP) configuration using a mobile device as a DPP configurator.

The figures are not exhaustive and do not limit the present disclosure to the precise form disclosed.

DETAILED DESCRIPTION

As noted above, devices such as sensors or devices having sensors embedded therein may connect to an IoT network via a WLAN, such as a WiFi network. WLANs, especially enterprise WLANs are often configured to be very secure, minimizing open-authentication APs, implementing WiFi Protected Access (WPA) authentication and encryption protocols, etc. For example, in order for a sensor to connect to its service in the cloud, the sensor may communicate over a WiFi network, and thus is configured to connect to the WiFi network through network discovery (e.g., by a WiFi network's service set identifier (SSID), authentication credentials (e.g., WiFi network-specific passwords, such as a pre-shared key or WPA authentication), and the identity of the sensor (e.g., a user ID, Media Access Control (MAC) address, or X.509 certificate).

Sensors may be configured, for example, by making a point-to-point WiFi connection from a smartphone, through which the requisite credentialing information can be entered. DPP refers to a mechanism promulgated by the WiFi Alliance for allowing a user's smartphone to bring a new IoT device onto an IoT network. DPP provisioning can encompass four processes: bootstrapping, authentication, configuration, and network discovery. Security can be maintained by keeping the new IoT device's credentials hidden and encrypted over the air. However, in an enterprise network, there are large numbers of APs, IoT devices, as well as other WiFi clients that may be located at different sites. Thus, the traditional manner in which DPP's provisioning process is implemented to onboard devices to a network, i.e., obtaining each IoT devices' bootstrapping information, provisioning each IoT device one by one, maintaining the smartphone or other configuring device, etc., can be a cumbersome and tedious process.

Accordingly, various embodiments described in the present disclosure implement a centralized configurator service that may be used to replace the role of a smartphone or other mobile device as a traditional DPP configurator. In some embodiments, the centralized configurator service may provision APs in a WLAN as enrollees by engaging in DPP authentication and configuration, after which the APs become discoverable. IoT device and/or other WiFi client bootstrapping information is received or obtained by the centralized configurator service. An AP or mobile device can act as a proxy for relaying DPP frames between the centralized configurator service and an IoT device/WiFi client as an enrollee.

In this way, bootstrapping information can be more easily obtained, and the DPP bootstrapping process can be made more flexible. Moreover, because a centralized management service (i.e., the centralized configurator service) is used to maintain enrollee bootstrapping information, repetitive bootstrapping involving the same enrollee can be avoided. Further still, less human action/interaction is needed when provisioning/re-provisioning enrollees. As will also be discussed below, various embodiments allow for a most appropriate proxy device to be selected in order to provide an optimum provisioning service.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

FIG. 1 illustrates an example DPP provisioning scenario in which a mobile device 100, such as a smartphone, acts as a traditional configurator for one or more IoT devices or WiFi clients (also referred to herein as enrollees). In the example illustrated by FIG. 1, an IoT device 102 may be embodied as a home appliance, such as a microwave oven. The objective of DPP is to achieve secure onboarding of devices, such as IoT devices. To that end, DPP-relevant information may be exchanged between one or more enrollees, in this case IoT device 102 and WLAN AP 104, and a configurator, in this case, mobile device 100.

The configurator typically configures each Enrollee with credential information, as well as information that allows each Enrollee to discover a network in which it is to operate. Any enrollee provisioned by the same configurator should be able to establish a secure connection with each other. As illustrated in FIG. 1, both IoT device 102 and WLAN AP 104 are provisioned by mobile device 100 acting as a configurator. Accordingly, IoT device 102 and WLAN AP 104 should be able to communicate with each other.

In particular, mobile device 100, acting as a configurator, may engage in DPP bootstrapping, DPP authentication, and DPP configuration. DPP bootstrapping may include transferring public key credentials from a transmitting entity (here, IoT device 102 and WLAN AP 104) to a relying entity (here, mobile device 100) in a manner that allows for the establishment of trust by the relying entity. Public key credentials may include a public bootstrap key shared by a configurator and enrollee, which can be used for initial authentication purposes or in some cases, for generating a temporary provisioning key. Bootstrapping can refer to obtaining or receiving the public bootstrap key out-of-band, which generally means that the configurator is physically proximate to or associated with the enrollee, thereby engendering the aforementioned trust.

In order to receive or obtain bootstrapping information, mobile device 100 may scan Quick Response (QR) codes that encrypt the public key credentials associated with each of IoT device 102 and WLAN AP 104. This may be useful when an enrollee does not have a user interface that can be used to authenticate itself with a configurator. Another way in which public key credentials may be exchanged is through Near-Field Communications (NFC), Bluetooth Low Energy (BLE) or other communications protocol or mechanism that can be trusted with maintaining the integrity of the public key credentials during the exchange.

DPP authentication may involve using a trusted public key to allow a configurator to perform strong authentication of an enrollee. For example, mobile device 100 may generate a symmetric key based on a shared secret that can be derived from hashing the bootstrap information. Mobile device 100 may also transmit a DPP authentication request message to IoT device 102 and WLAN AP104, where the DPP authentication request message comprises the shared secret and, e.g., a first nonce encrypted by the first symmetric key. Upon receipt of the DPP authentication request message by the IoT device 102 and WLAN AP, each of IoT device 102 and WLAN AP104 checks to see if a hash of its public bootstrap key is included in the DPP authentication request message. If so, IoT device 102 and WLAN AP 104 can derive the first symmetric key, which can be used to obtain the first nonce. IoT device 102 and WLAN AP 104 may each generate a second nonce, a shared secret, and a second symmetric key, wrapping the first and second nonces along with their respective capabilities in the first symmetric key. Moreover, each of IoT device 102 and WLAN AP 104 may wrap an authenticating tag in the second symmetric key, place a hash of its public bootstrap key, among other information including the wrapped authentication tag in DPP response message that is returned to mobile device 100. Mobile device 100 can validate the DPP response message and transmit a DPP authentication confirmation message to each of IoT device 102 and WLAN AP104.

Following DPP authentication, mobile device 100 may configure each of IoT device 102 and WLAN AP104 for communications between it and other network devices, as well as for communications between it and infrastructure devices, e.g., one or more APs. It should be noted that APs are also enrollees. IoT device 102 and WLAN AP 104 may each enter into DPP configuration mode by sending a DPP configuration request message to mobile device 100. Mobile device 100 responds with a DPP configuration response message, which can be used to provision IoT device 102 and WLAN AP 104 with the requisite configuration information needed for IoT device 102 and WLAN AP 104 to establish secure access/communications with the network.

As alluded to above, out-of-band DPP authentication is premised on physical proximity or other physical association between an enrollee and configurator. While this is feasible in smaller, e.g., home networks, the same is not true for larger, enterprise networks, e.g., enterprise WLANs. Accordingly, as also alluded to above, a centralized configurator service may be used to replace the role of a smartphone or other mobile device as a traditional DPP configurator in accordance with various embodiments of the present disclosure.

Figure 2A:
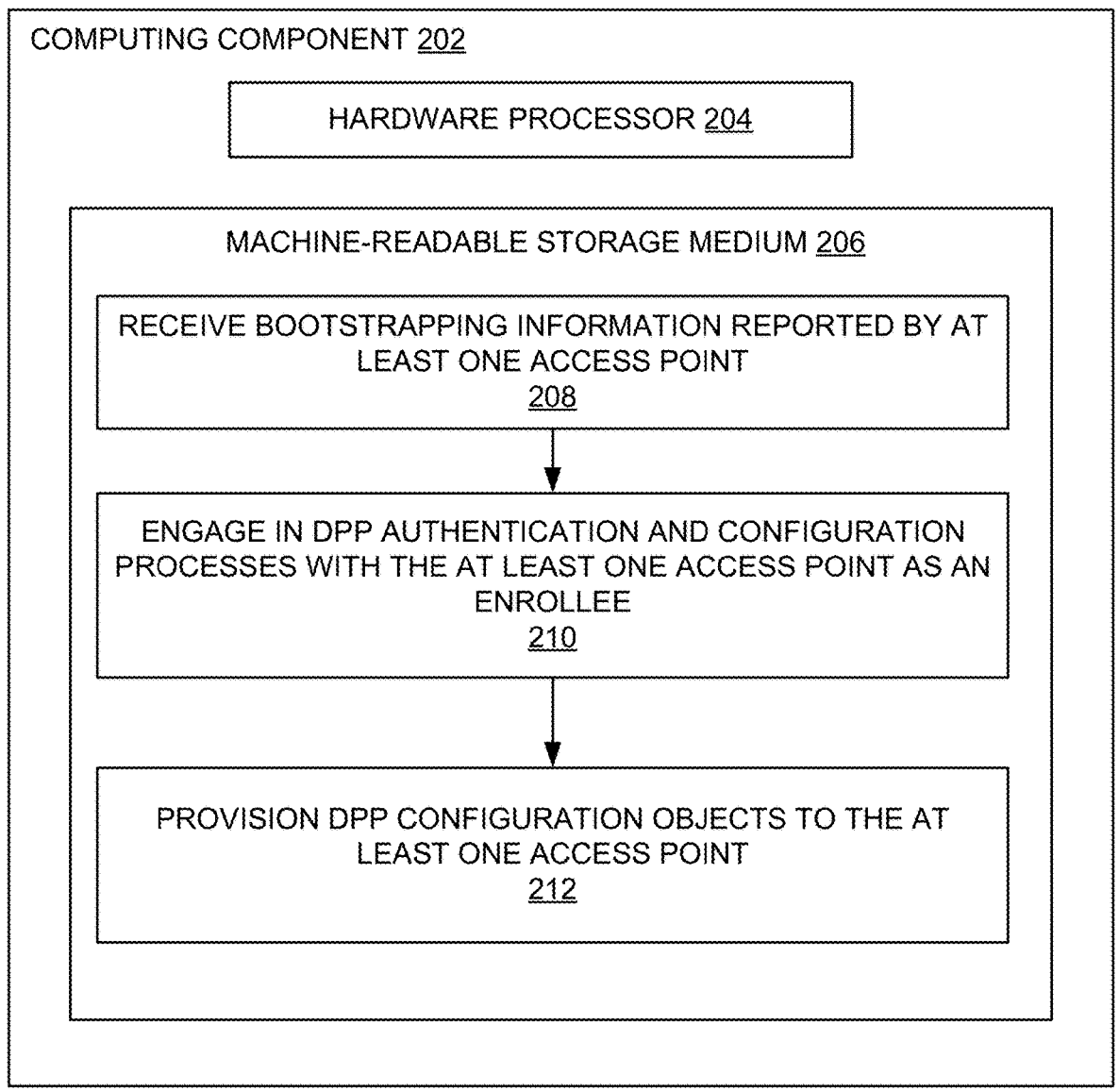
FIG. 2A is a block diagram of an example computing component for configuring an access point (AP) using a centralized configurator service in accordance with one embodiment of the present disclosure.

FIG. 2A illustrates an example computing component for provisioning an access point (AP) using a centralized configurator service in a system 200. FIG. 2A will be described in conjunction with FIG. 2B, which illustrates an example network in which one or more APs are configured using a centralized configurator service in accordance with one embodiment of the present disclosure.

Referring to FIG. 2A, a computing component 202 may include a hardware processor 204 and a machine-readable storage medium 206. Computing component 202 may be, for example, a server computer, a controller, or any other similar computing component capable of processing data. Hardware processor 204 may be one or more central processing units (CPUs), semiconductor-based microprocessors, and/or other hardware devices suitable for retrieval and execution of instructions stored in machine-readable storage medium, 206. Hardware processor 204 may fetch, decode, and execute instructions, such as instructions 208-212 to configure APs 230A-230C for operation in network 200.

A machine-readable storage medium, such as machine-readable storage medium 206, may be any electronic, magnetic, optical, or other physical storage device that contains or stores executable instructions. Thus, machine-readable storage medium 206 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 206 may be a non-transitory storage medium, where the term "non-transitory" does not encompass transitory propagating signals. As described in detail below, machine-readable storage medium 206 may be encoded with executable instructions, for example, instructions 208-212, for onboarding APs 230A-230C onto network 200.

Figure 2B:
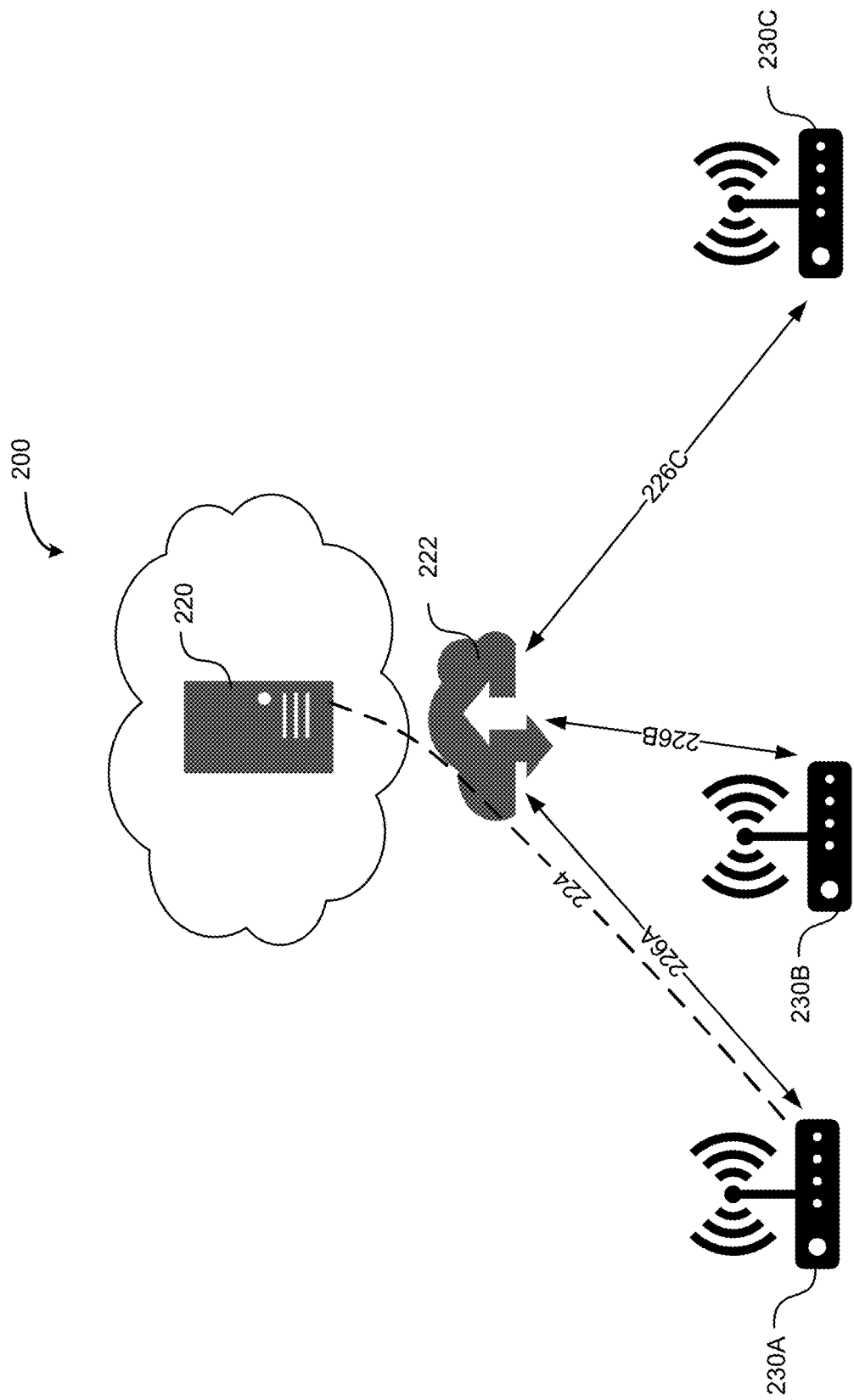
FIG. 2B illustrates an example network in which one or more APs are configured using a centralized configurator service in accordance with one embodiment of the present disclosure.

Computing component 202 may embody/may be embodied in a centralized configurator server 220 (see FIG. 2B). Centralized configurator server 220 provides the aforementioned centralized configurator service that can take the place of mobile devices traditionally used as configurators in a network 200, such as a WLAN. Centralized configurator server 220 may reside in a public, private, or hybrid cloud, and can be implemented as a controller, an independent server, an independent micro service running on a cloud platform, or running on a traditional, independent server. It should be understood that centralized configurator server 220 can be accessed/reached by all APs in various network deployment scenarios.

FIG. 2B illustrates a plurality of APs (AP 230A, AP 230B, and AP 230C) each in communication with centralized configurator server 220 via an intermediate network 222. Intermediate network 222 may be a local network, the Internet, etc. It should be noted that intermediate network 222 is not a necessary element of system 200, meaning APs 230A, 230B, and 230C may communicate directly with centralized configurator server 220. In some embodiments, intermediate network 222 may represent a cloud platform, in which case, centralized configuration 220 may be implemented, as a micro service on which DPP can be run, as alluded to above. That is, the micro service implementation of centralized configurator 220 can be treated as a virtual entity that communications with all APs through the cloud platform, separate from other AP control modules. Centralized configurator server 220 may reside in the cloud, where the cloud represents a network of servers (centralized configurator server 220 being one of those servers) that operate and/or communicate with each other to effectuate a single ecosystem. A public cloud may share publicly available resources/services over, e.g., the Internet, while a private cloud is not shared and may only offer resources/services over a private data network. A hybrid cloud may share services between public and private clouds depending on the purpose of the services. Centralized configurator server 220 may, in some embodiments, be an independent server, or a controller.

Each of AP 230A, 230B, and 230C may act as a bridge connecting a wireless network to a wired network. For example, APs 230A, 230B, and 230C can provide access to a wireless network throughout a large area, such as a large building. APs may be distributed throughout an area for which wireless network access is desired such that a client device (e.g., IoT device 102 and/or WiFi client 104 of FIG. 1) within the area will generally be within range of one or more of the APs, each AP providing a wireless interface to a wired network.

Like many network devices, a typical AP has a number of configurable settings that affect the way the AP functions and/or how a client or other network device interfaces with the AP. For example, one setting of an access point may specify the channel on which the AP will communicate with client devices. Other settings may specify the type of encryption to be used in communicating with client devices, an encryption key to be used, and a SSID that identifies the network to which the AP provides access. One of the benefits associated with the use of APs in an area is the ability of a client device to seamlessly transition between APs as the client device is moved to different locations within the area.

Centralized configurator server 220 is accessible by each of APs 230A, 230B, and 230C via intermediate network 222. As noted above, intermediate network 222 may not be needed, and one or more of APs 230A, 230B, and 230C may interact with centralized configurator server 220 directly. When an AP, e.g., AP 230A boots up, AP 230A establishes a connection with centralized configurator server 220 in order to provide centralized configurator server 220 with its bootstrapping information. That is, and referring back to FIG. 2A, hardware processor 204 may execute instruction 208 to receive bootstrapping information reported by at least one AP, e.g., AP 230A. As noted above, the bootstrapping information reported by at least AP 230A may include a public bootstrap key. It should be noted that other information, such as information indicative of operating class and channel number lists may also be included in the bootstrapping information reported by AP 230A. The operating class and channel number list may indicate on which wireless channel AP 230A will listen for a DPP authentication request message.

As described above, the DPP authentication and DPP configuration/provisioning processes involve the exchange of various messages/information between an enrollee and configurator, in this case, between AP 230A and centralized configurator server 220. Accordingly, hardware processor 204 may execute instruction 210 to receive engage in DPP authentication and DPP configuration processes with the at least one AP as an enrollee.

In particular, centralized configurator server 220 may generate a symmetric key based on a shared secret that can be derived from hashing the bootstrap information reported by AP 230A. Configurator serer 220 may also transmit a DPP authentication request message to AP 230A, where the DPP authentication request message comprises the shared secret and, e.g., a first nonce encrypted by the first symmetric key. Upon receipt of the DPP authentication request message by AP 230A, AP 230A checks to see if a hash of its public bootstrap key is included in the DPP authentication request message. If so, AP 230A can derive the first symmetric key, which can be used to obtain the first nonce. AP 230A may generate a second nonce, a shared secret, and a second symmetric key, wrapping the first and second nonces along with their respective capabilities in the first symmetric key. Moreover, AP 230A may wrap an authenticating tag in the second symmetric key, place a hash of its public bootstrap key, among other information including the wrapped authentication tag in a DPP response message that is returned to centralized configurator server 220. Centralized configurator server 220 can validate the DPP response message and transmit a DPP authentication confirmation message to AP 230A.

Following DPP authentication, centralized configurator server 220 may configure AP 230A for communications between it and other network devices, as well as for communications between it and infrastructure devices, in this example, APs 230B and 230C. AP 230A enters into DPP configuration mode by sending a DPP configuration request message to centralized configurator server 220. Centralized configurator server 220 responds with a DPP configuration response message, which can be used to provision AP 230A with the requisite configuration information needed for AP 230A to establish secure access/communications with network 200. It should be understood that the aforementioned communications and exchange or messaging and/or information can occur in accordance with, for example, the IEEE 802.3 Ethernet protocol. This is illustrated in FIG. 2A by communications 226A (between AP 230A and centralized configurator server 220). It should be noted that the aforementioned exchange of messages/information may also occur between each of AP 230B and AP 230C and centralized configurator server 220 via communications 226B and 226C, respectively. It should also be noted that because all APs have a wired connection with centralized configurator server 220, these APs are pre-authenticated by centralized configurator server 220 using the IEEE 802.3 protocol, as mentioned previously.

Typically, the public bootstrapping key may be used for initial authentication between centralized configurator server 220 and AP 230A. Once the initial authentication is completed, centralized configurator server 220 may configure AP 230A for communication within network 200. This configuring may include configurator keys used by centralized configurator server 220 for generating a configuration object that carries the configuration of AP 230A and authorizes connectivity between AP 230A and another device, e.g., an IoT device or WiFi client, such as another AP, e.g., APs 230B and 230C. One of ordinary skill in the art would understand that the configurator keys may include a configurator private signing key to sign a configuration object. This may be done to verify configuration objects of other devices signed by the same configurator, i.e., centralized configurator server 220. In this way, a configuration object can be verified by any other device in network 200. Accordingly, hardware processor 206 may execute instruction 212 to configure DPP configuration objects to the at least one AP, in this example, AP 230A. It should be noted that in some embodiments, DPP configuring of configuration objects may occur over a DPP provisioning channel 224. The same or different dedicated DPP provisioning channels may also be established between each of AP 230B and AP 230C and centralized configurator server 220 (not shown). Once the configuration object is configured to AP 230A, the network discovery phase of DPP provisioning may commence, and AP 230A may begin beaconing its SSID to the network, i.e., network 200.

Centralized configurator server 220 may obtain bootstrapping information associated with all IoT devices or other WiFi clients in network 200 via QR code scanning of the IoT devices/WiFi clients, through an exchange between the IoT devices/WiFi clients over NFC, BLE, etc. For example, a mobile device, e.g., mobile device 100 (FIG. 1) traditionally acting as a configurator, may scan QR codes associated with each IoT devices/WiFi clients operating in/to be operating in network 200. It should be understood that depending on the configuration of network 200 and/or the manner in which it is to be utilized, not all of the IoT devices/WiFi clients operating therein may be scanned to obtain bootstrapping information. The mobile device may report the bootstrapping information (obtained through QR code scanning) to centralized configurator server 220 via wireless communications, e.g., over a 4G communications network, or a WLAN (i.e., network 200 itself).

In some embodiments, if the APs 230A, 230B, and 230C support WiFi and BLE, an IoT device, such as IoT device 102 (FIG. 1), may relay its bootstrapping information to an AP, e.g., AP 230A, using BLE, after which AP 230A can report the bootstrapping information obtained from IoT device 102 to centralized configurator server 220 using WiFi.

After the bootstrapping information of the relevant IoT devices and WiFi clients has been obtained by centralized configurator server 220, centralized configurator server 220 may engage in DPP authentication and DPP configuration processes with the IoT devices/WiFi clients as enrollees. In accordance with various embodiments, a mobile device, e.g., mobile device 100 or an AP, e.g., AP 230A, may act as a proxy for relaying DPP frames used for exchanging DPP messaging and DPP-related information between centralized configurator server 220 and each of the IoT devices/WiFi clients.

Figure 3A:
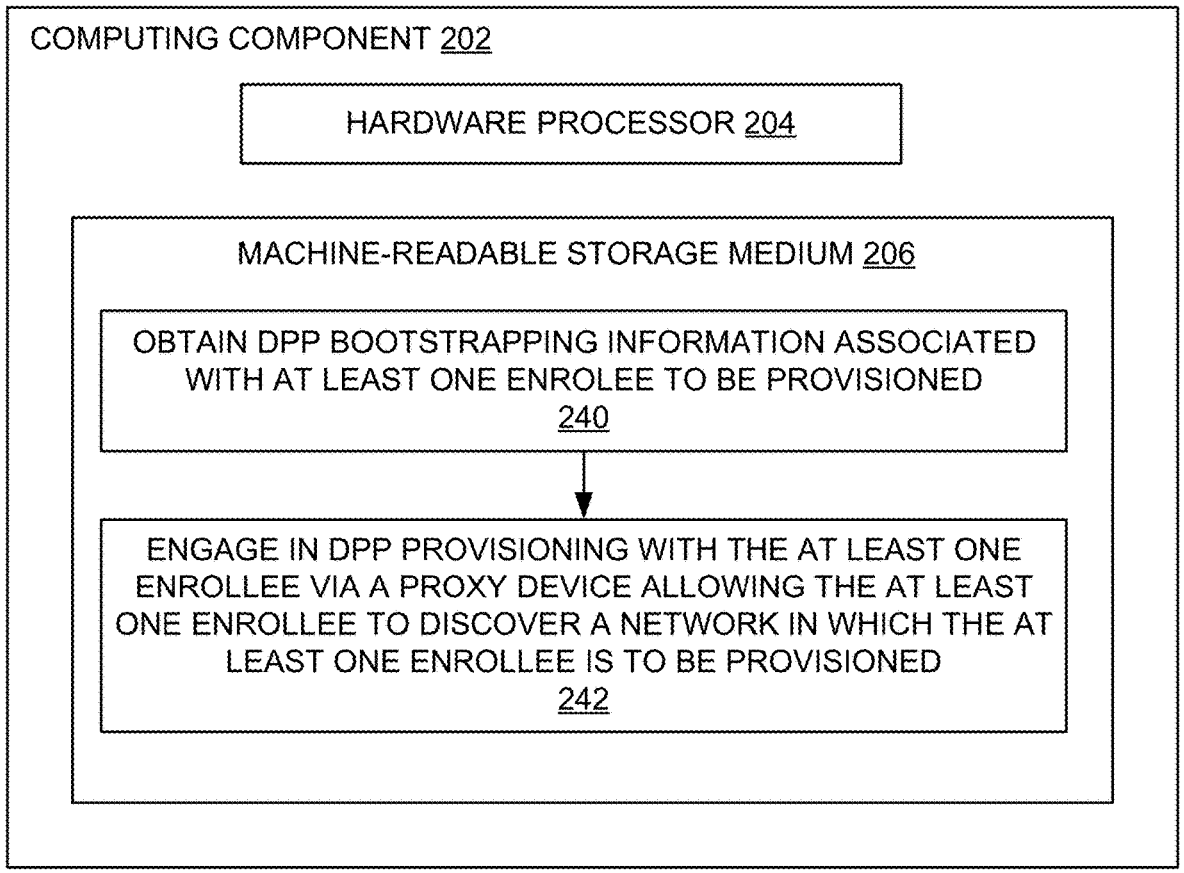
FIG. 3A is a block diagram of an example computing component for configuring enrollees using a centralized configurator service in accordance with one embodiment of the present disclosure.

FIG. 3A illustrates an example computing component for provisioning an enrollee in accordance with DPP provisioning using a centralized configurator service. FIG. 3A will be described in conjunction with FIGS. 3B and 3C, which illustrate example networks in which a mobile device or an AP may be used as a relay proxy between one or more enrollees and a centralized configurator server.

Referring to FIG. 3A, and as previously described, computing component 202 may include a hardware processor 204 and a machine-readable storage medium 206. Hardware processor 204 may fetch, decode, and execute instructions, such as instructions 240 and 242 to provision one or more enrollees in accordance with DPP provisioning using centralized configurator server 220.

As described in detail below, machine-readable storage medium 206 may be encoded with executable instructions, for example, instructions 240 and 242, for provisioning one or more enrollees in accordance with DPP provisioning using centralized configurator server 220. Previously described computing component 202 may embody/may be embodied in centralized configurator server 220 (see FIG. 2B).

Figure 3B:
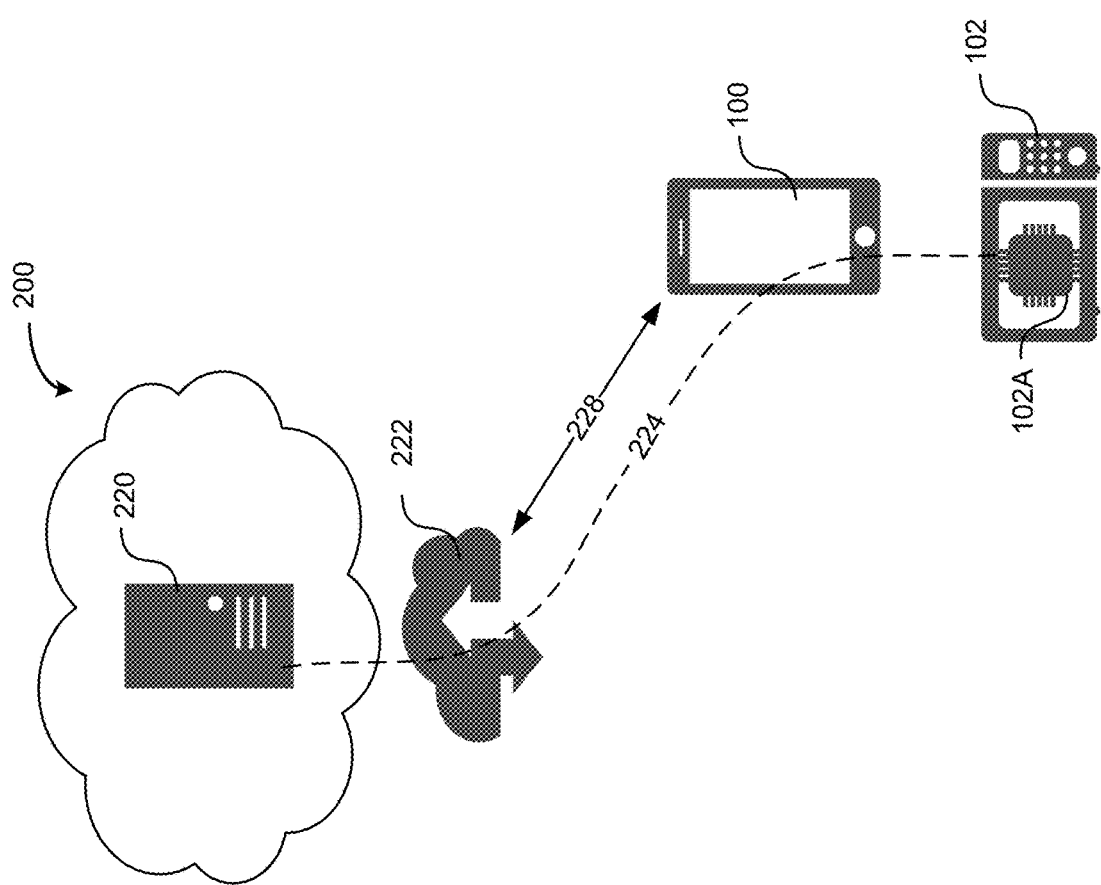
FIG. 3B illustrates an example network in which one or more enrollees are configured using a centralized configurator service and a mobile device proxy in accordance with one embodiment of the present disclosure.

Referring to FIG. 3B, an as previously described, mobile device 100, acting as proxy, and no longer as a configurator, may obtain the bootstrapping information of a sensor 102A of IoT device 102 by scanning a QR code of sensor 102A or through NFC, BLE, or other method of communications between sensor 102A and mobile device 100. Mobile device 100 may report the bootstrapping information obtained from sensor 102A to centralized configurator server 220 by way of the (private, public, or hybrid) cloud 222 via a wireless communications method, again, e.g., 4G or WLAN communications. This is indicated in FIG. 3B by communications 228. Accordingly, and referring back to FIG. 3A, hardware processor 204 may execute instruction 240 stored on machine-readable storage medium 206 to obtain DPP bootstrapping information associated with at least one enrollee to be provisioned. In this example, the at least one enrollee to be provisioned is IoT device 102, or more specifically sensor 102A of IoT device 102.

Once the bootstrapping information associated with sensor 102A is exchanged with centralized configurator server 220, the aforementioned DPP authentication and DPP configuration processes that ultimately allow IoT device 102/sensor 102A to be provisioned are performed between sensor 102A and centralized configurator server 220. That is, sensor 102A may exchange DPP authentication and DPP configuration messaging/information with centralized configurator server 220 over DPP provisioning channel 224 using mobile device 100 as a relay proxy for the DPP frames used for the exchanging DPP authentication and DPP configuration messaging/information.

Once sensor 102A obtains the requisite DPP configuration objects (as previously described above), sensor 102A is able to discover network 200, e.g., other devices operating in network 200, such as other IoT devices (not shown), other WiFi clients, and/or other infrastructure devices, e.g., AP 230A, AP 230B, and/or AP 230C. That is, and referring back to FIG. 3A, hardware processor 204 may execute instruction 242 to engage in DPP provisioning with the at least one enrollee via a proxy device allowing the at least one enrollee to discover a network in which the at least one enrollee is to be provisioned.

In accordance with some embodiments, an AP, e.g., AP 230A, may act as a proxy instead of mobile device 100. That is, AP 230A, may detect IoT device 102/sensor 102A (or other device), and trigger the exchange of DPP messaging/information between IoT device 102/sensor 102A. This can be accomplished automatically without human interaction or intervention, unlike in traditional DPP provisioning. Moreover, an IoT device or WiFi client may be re-provisioned directly by centralized configurator server 220 by exchanging the requisite DPP messaging/information because the bootstrapping information of the IoT device/WiFi client is already known/has already been obtained. It should be noted that AP 230A may also be an authenticated DPP enrollee at the same time.

Figure 3C:
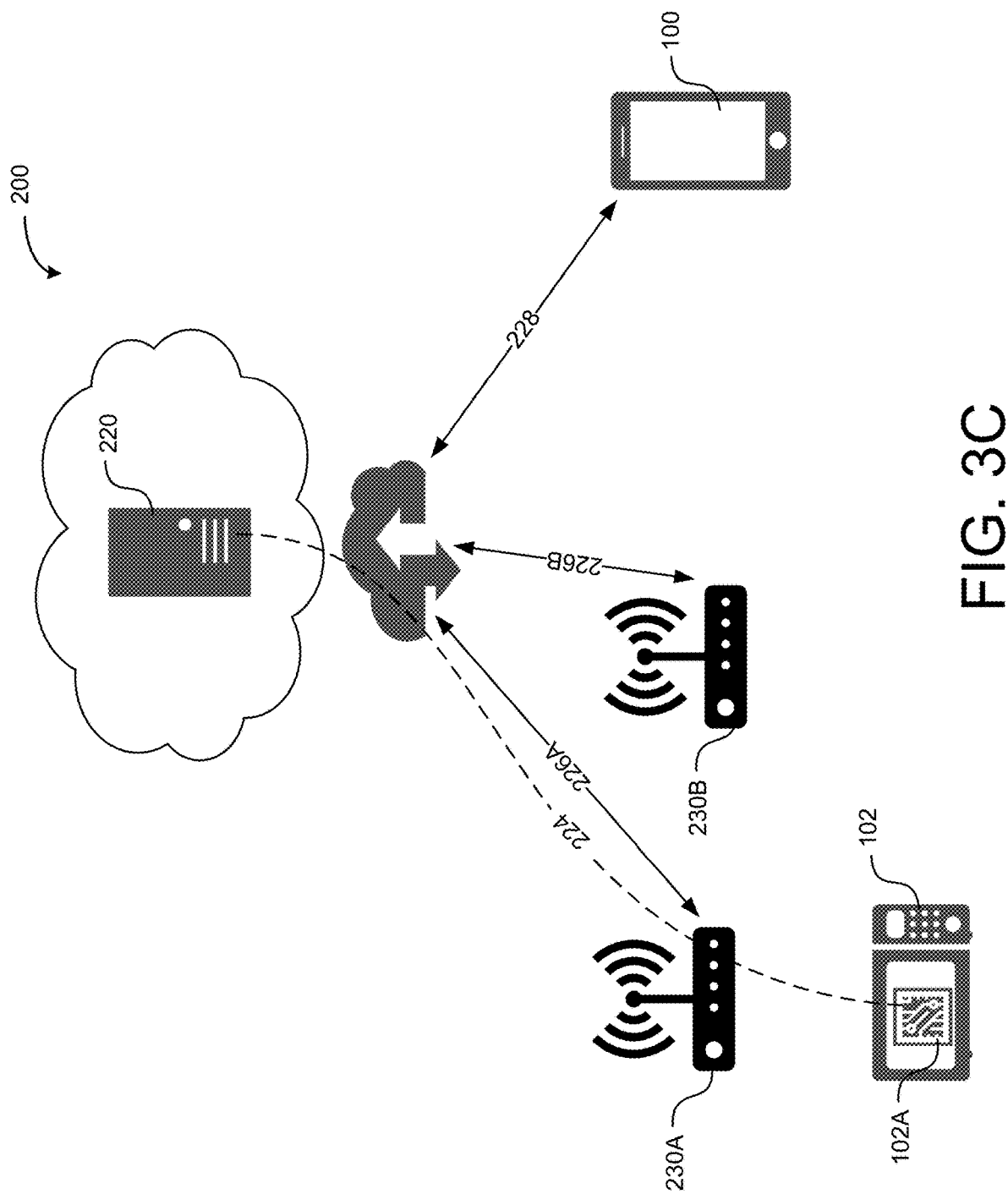
FIG. 3C illustrates an example network in which one or more enrollees are configured using a centralized configurator service and an AP proxy in accordance with one embodiment of the present disclosure.

In particular, and referring to FIG. 3C, the bootstrapping information associated with sensor 102A may be obtained, e.g., previously, vis-à-vis mobile device 100 scanning sensor 102A's QR code or by exchanging bootstrapping information via NFC, BLE, or other communications method, after which, mobile device 100 may report the bootstrapping information to centralized configurator server 220 via communications 228. Alternatively, sensor 102A may advertise its bootstrapping information through, e.g., BLE communications, to an AP, e.g., AP 230A. AP 230A may perform WiFi scanning to detect sensor 102A, after which sensor 102A's bootstrapping information can be obtained as described herein. In these embodiments, AP 230A may report the bootstrapping information to centralized configurator server 220 via communications 226A. It should be understood that this is made possible because the APs operating in network 200 have already been provisioned (through DPP provisioning) and are discoverable by devices, such as sensor 102A.

In some embodiments, multiple APs, e.g., AP 230A and AP 230B may scan for and detect sensor 102A. Both AP 230A and AP 230B may report the detection of sensor 102A to centralized configurator server via communications 226A and 226B, respectively. This can occur, e.g., in an enterprise WLAN, where more than one AP can be in a position to detect an IoT device or WiFi client through scanning (active or passive). Accordingly, centralized configurator server 220 may select one of the multiple APs that detected the IoT device, the IoT device in this example being IoT device 102/sensor 102A, and the selected AP acting as a proxy through which DPP provisioning procedures or processes may be initialized. It should be noted that every AP can report its (WiFi) scanning results to centralized configurator server 220 including an IoT device's identity, e.g., MAC address, as well as the public bootstrapping key (which may be contained in a scanned QR code). In this way, centralized configurator server 220 can be made aware of situations where multiple APs detect the same IoT device, avoiding redundant provisioning procedures, for example. Bootstrapping information an IoT device that has detected by multiple APs may be merged in centralized configurator server 220.

Selection of an AP can be dependent on one or more of the following, but not limited to, signal-to-noise ratio (SNR) reported or measured at the AP relative to the IoT device at issue, traffic load conditions at an AP, as well as other factors that may be weighed or considered. These other factors may include, but are not limited to AP transmit power, and channel busy conditions. In this way, the best or optimal proxy device can be used to provide a better, e.g., faster or with less error, DPP provisioning experience.

In accordance with various embodiments, use of a centralized configurator server (or service) allows the management of DPP bootstrapping information to be centrally managed, while maintaining the bootstrapping information of any and all enrollees in a network, including APs IoT devices, and other WiFi clients. Moreover, there are multiple ways (described above) in which the centralized configurator server (or service) can obtain bootstrapping information beyond the traditional use of QR code scanning or NFC/BLE communications between an enrollee and mobile device acting as a configurator. For example, if centralized configurator server 220 is residing in the cloud, or e.g., as a micro service on a cloud platform 222, which happens to be a public cloud, a manufacturer of IoT devices, such as sensor 102A, can upload each IoT devices' DPP bootstrapping information to centralized configurator server 220 before IoT device is ever implemented/located in network 200. A user may also scan multiple QR codes associated with multiple IoT devices in order to report bootstrapping information of multiple IoT devices, e.g., in a batch format, ultimately making the DPP bootstrapping process more efficient by not having to process IoT devices individually and completely, one-at-a-time. In other words, various embodiments of the present disclosure can accomplish parallel provisioning.

In this way, various problems associated with traditional DPP provisioning can be avoided or at the least, mitigated. For example, obtaining DPP bootstrapping information of devices/enrollees can be achieved with less/minimal effort. Also, centralizing management of bootstrapping information allows for bootstrapping information to be more easily maintained, and avoids repetitive DPP bootstrapping for the same enrollee. Further still, various embodiments of the present disclosure allow for DPP provisioning of multiple enrollees, simultaneously, as well as the ability to being DPP provisioning procedures automatically.

Figure 4:
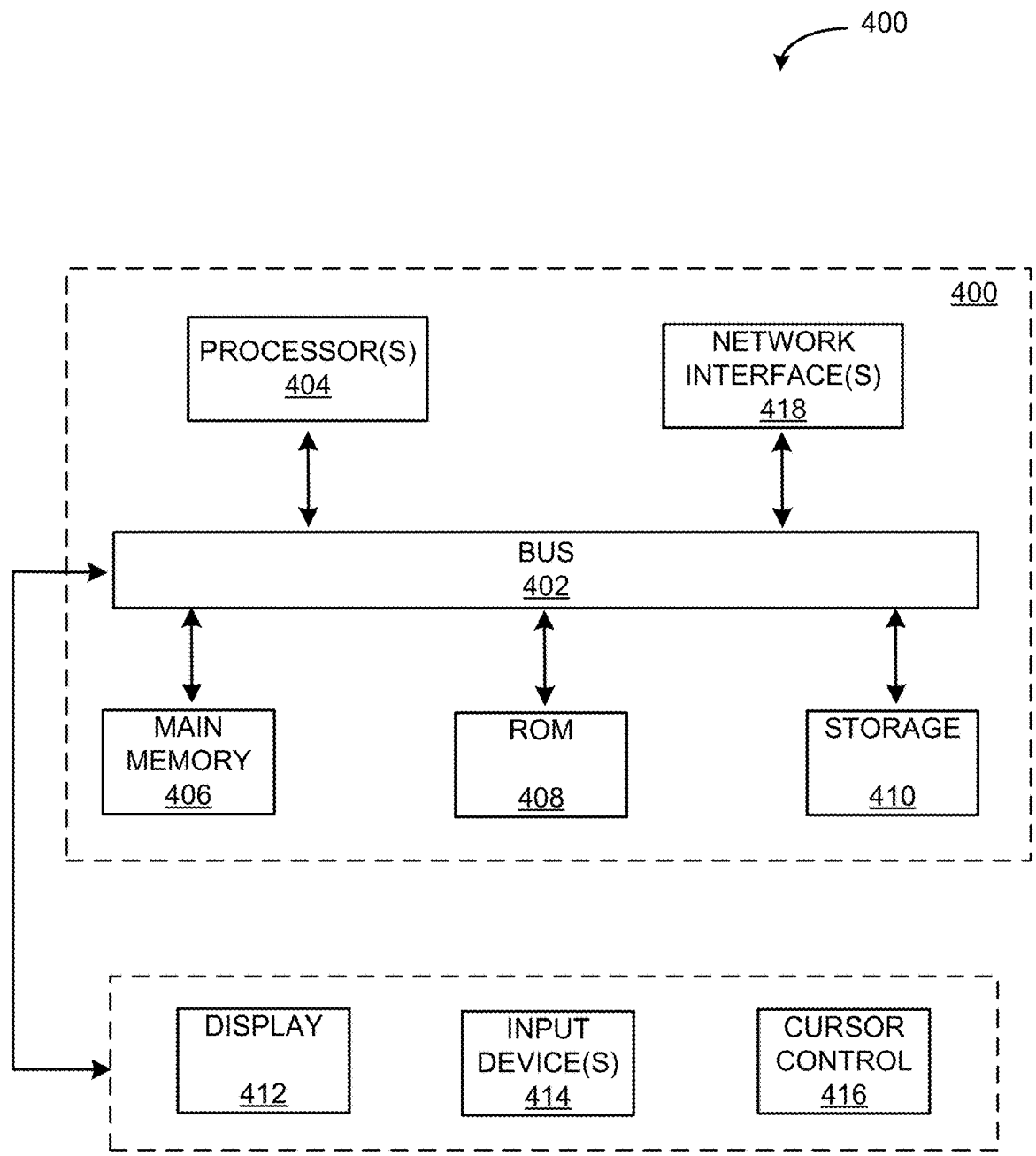
FIG. 4 is an example computing component that may be used to implement various features of embodiments described in the present disclosure.

FIG. 4 depicts a block diagram of an example computer system 400 in which various of the embodiments described herein may be implemented. Computer system 400 may be an embodiment of centralized configurator server 220, one of APs AP 230A, 230B, and/or 230C, as well as mobile device 100 and IoT device 102. The computer system 400 includes a bus 402 or other communication mechanism for communicating information, one or more hardware processors 404 coupled with bus 402 for processing information. Hardware processor(s) 404 may be, for example, one or more general purpose microprocessors.

The computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

The computer system 400 may be coupled via bus 402 to a display 412, such as a liquid crystal display (LCD) (or touch screen), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. In some embodiments, the same direction information and command selections as cursor control may be implemented via receiving touches on a touch screen without a cursor.

The computing system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

The computer system 400 also includes a communication interface 418 coupled to bus 402. Network interface 418 provides a two-way data communication coupling to one or more network links that are connected to one or more local networks. For example, communication interface 418 may be an integrated services digital network (ISDN) card, cable modem, satellite modem, or a modem to provide a data communication connection to a corresponding type of telephone line. As another example, network interface 418 may be a local area network (LAN) card to provide a data communication connection to a compatible LAN (or WAN component to communicated with a WAN). Wireless links may also be implemented. In any such implementation, network interface 418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 418, which carry the digital data to and from computer system 400, are example forms of transmission media.

The computer system 400 can send messages and receive data, including program code, through the network(s), network link and communication interface 418. In the Internet example, a server might transmit a requested code for an application program through the Internet, the ISP, the local network and the communication interface 418.

The received code may be executed by processor 404 as it is received, and/or stored in storage device 410, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

What is claimed is:

1. A method comprising:
obtaining, at a centralized configurator, Device Provisioning Protocol (DPP) bootstrapping information associated with at least one enrollee to be provisioned; and
subsequently engaging in DPP provisioning between the centralized configurator and the at least one enrollee via a DPP provisioning channel established between the at least one enrollee and the centralized configurator through a proxy device allowing the at least one enrollee to discover a network in which the at least one enrollee is to be provisioned using the DPP bootstrapping information, the at least one enrollee discovering the network via an access point (AP) that was also previously provisioned by the centralized configurator.

2. The method of claim 1, wherein the obtaining of the DPP bootstrapping information comprises receiving the DPP bootstrapping information from the proxy device via wireless communications.

3. The method of claim 1, wherein the proxy device comprises a mobile device adapted to obtain the DPP bootstrapping information via at least one of short-range wireless communications between the proxy device and the enrollee, and scanning, by the proxy device, of a Quick Response (QR) code associated with the at least one enrollee, and wherein the centralized configurator comprises one of a server, a micro service, or an application running on the server.

4. The method of claim 1, wherein engaging in DPP provisioning comprises performing DPP authentication and DPP configuration of the at least one enrollee.

5. The method of claim 4, wherein the performance of DPP authentication comprises performing mutual authentication between the centralized configurator server and the at least one enrollee.

6. The method of claim 4, wherein the performance of DPP configuration comprises provisioning the at least one enrollee with configuration information needed by the at least one enrollee to establish secure communications with at least one other network device.

7. The method of claim 4, wherein the performance of DPP authentication and DPP configuration of the at least one enrollee occurs over the DPP provisioning channel established between the at least one enrollee and the centralized configurator server.

8. The method of claim 7, wherein the proxy device relays DPP frames representative of at least one of DPP authentication and DPP configuration messages and related information between the at least one enrollee and the centralized configurator server.

9. The method of claim 1, wherein the proxy device comprises the AP operating in the network.

10. The method of claim 9, wherein the AP detects the at least one enrollee by at least one of WiFi scanning of the network, and receiving a Bluetooth Low Energy (BLE) advertisement from the at least one enrollee.

11. The method of claim 10, further comprising automatically triggering an exchange of DPP frames representative of DPP authentication and DPP configuration messages and related information between the at least one enrollee and the centralized configurator server through the AP.

12. The method of claim 10, further comprising selecting the AP from a plurality of APs to serve as the proxy device based on one or more operating characteristics of the AP.

13. The method of claim 9, further comprising transmitting one or more DPP configuration objects to the at least one enrollee enabling the at least one enrollee to discover the network.

14. The method of claim 1, wherein the network comprises a wireless local area network (WLAN).

15. The method of claim 1, wherein the at least one enrollee comprises at least one of an Internet of Things (IoT) device and a WiFi client.

16. A centralized configurator server, comprising:
at least one processor; and
a non-transitory machine-readable storage medium including instructions that when executed cause the at least one processor to:
receive bootstrapping information reported by at least one access point (AP) in a wireless local area network (WLAN) prior to engaging in Device Provisioning Protocol (DPP) authentication and DPP configuration processes with the at least one AP;
engage in the DPP authentication and DPP configuration processes with the at least one AP, wherein the at least one AP comprises an enrollee of the WLAN;
provision one or more DPP configuration objects to the at least one AP allowing the at least one AP to beacon information identifying the WLAN to other enrollees of the WLAN; and
provision one or more enrollees of the other enrollees of the WLAN over a dedicated DPP provisioning channel established between the centralized configurator and the one or more enrollees through one of the at least one AP and a mobile device being used as a proxy device for relaying DPP frames representative of at least one of messages and information associated with the DPP authentication and DPP configuration processes between the centralized configurator server and the one or more enrollees.

17. The centralized configurator server of claim 16, wherein the other enrollees of the WLAN comprise at least one of Internet of Things (IoT) devices and WiFi clients.

18. The centralized configurator server of claim 16, wherein the information identifying the WLAN to the other enrollees of the WLAN comprises a service set identifier (SSID) of the WLAN.

19. The centralized configurator server of claim 16, wherein the DPP frames are encapsulated in messaging formatted in accordance with the Institute of Electrical and Electronic Engineers (IEEE) 802.3 protocol.

20. The centralized configurator server of claim 16, wherein the DPP frames are transmitted between the centralized configurator server and the one or more enrollees over the dedicated DPP provisioning channel by way of the proxy device.

* * * * *